(12) United States Patent
Yoshihama (10) Patent No.: US 8,312,388 B2
(45) Date of Patent: Nov. 13, 2012

(54) INFORMATION PROCESSING APPARATUS, INFORMATION PROCESSING METHOD AND COMPUTER READABLE MEDIUM

(75) Inventor: Taro Yoshihama, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 346 days.

(21) Appl. No.: 12/699,579

(22) Filed: Feb. 3, 2010

(65) Prior Publication Data

US 2011/0016429 A1   Jan. 20, 2011

(30) Foreign Application Priority Data

Jul. 15, 2009 (JP) ................................ 2009-166693

(51) Int. Cl.
*G06F 17/30* (2006.01)
*G06F 3/048* (2006.01)

(52) U.S. Cl. ...................................... 715/838; 715/745

(58) Field of Classification Search .................. 715/838; 345/179
See application file for complete search history.

(56) References Cited

U.S. PATENT DOCUMENTS

| | | | | |
|---|---|---|---|---|
| 8,041,701 | B2* | 10/2011 | Amato et al. ................. | 707/707 |
| 2002/0054158 | A1* | 5/2002 | Asami .......................... | 345/838 |
| 2004/0257346 | A1* | 12/2004 | Ong et al. ..................... | 345/179 |
| 2005/0111051 | A1 | 5/2005 | Uchikawa | |
| 2006/0075362 | A1* | 4/2006 | Moteki et al. ................ | 715/838 |
| 2006/0106539 | A1* | 5/2006 | Choate et al. ................ | 702/2 |
| 2006/0119703 | A1* | 6/2006 | Hibi et al. .................... | 348/143 |
| 2006/0204142 | A1 | 9/2006 | West et al. | |
| 2006/0242163 | A1* | 10/2006 | Miller et al. ................. | 707/100 |
| 2006/0265417 | A1* | 11/2006 | Amato et al. ................ | 707/102 |
| 2007/0097229 | A1 | 5/2007 | Matsubara et al. | |
| 2008/0136790 | A1* | 6/2008 | Hio .............................. | 345/173 |
| 2009/0235155 | A1* | 9/2009 | Ueda ............................ | 715/233 |
| 2010/0225667 | A1* | 9/2010 | Nishiyama et al. .......... | 345/660 |

FOREIGN PATENT DOCUMENTS

| | | |
|---|---|---|
| JP | A-2005-157569 | 6/2005 |
| JP | A-2007-148688 | 6/2007 |
| JP | A-2007-148689 | 6/2007 |
| JP | A-2007-310808 | 11/2007 |
| JP | A-2008-197874 | 8/2008 |
| WO | WO 2006/006027 A1 | 1/2006 |

OTHER PUBLICATIONS

Australian Office Action issued in Australian Patent Application No. 2010200518 dated Apr. 5, 2011.

* cited by examiner

*Primary Examiner* — Daeho Song
(74) *Attorney, Agent, or Firm* — Oliff & Berridge, PLC (57) ABSTRACT

According to an aspect of the invention, an information processing apparatus includes an operation acquisition module, a thumbnail image creating module, and a thumbnail image storing control module. The operation acquisition module acquires an operation to an electronic file displayed on a display device, the operation to be acquired by the operation acquisition module being set previously. The thumbnail image creating module creates a thumbnail image corresponding to the acquired operation. The thumbnail image storing control module controls the thumbnail image so as to store the thumbnail image associated with specifying information by which the electronic file is specified.

9 Claims, 8 Drawing Sheets

| CONTENTS OF OPERATION | IMPORTANCE |
|---|---|
| OPEN ELECTRONIC FILE | 5 |
| ENLARGED DISPLAY | 50+2/SECOND |
| TEXT DATA ATTACH | 200+1/CHARACTER |
| TEXT COPY | 200+1/CHARACTER |
| GRAPHIC DATA ATTACH | 50 |
| IMAGE COPY | 50 |
| CREATE NEW ELECTRONIC FILE | 300 |
| ELECTRONIC FILE EDIT | 50 |
| PAGE MOVEMENT | 50 |
| ELECTRONIC FILE DIVISION | 50 |

| CONTENTS OF OPERATION | IMPORTANCE |
|---|---|
| OPEN ELECTRONIC FILE | 5 |
| ENLARGED DISPLAY | 50+2/SECOND |
| TEXT DATA ATTACH | 200+1/CHARACTER |
| TEXT COPY | 200+1/CHARACTER |
| GRAPHIC DATA ATTACH | 50 |
| IMAGE COPY | 50 |
| CREATE NEW ELECTRONIC FILE | 300 |
| ELECTRONIC FILE EDIT | 50 |
| PAGE MOVEMENT | 50 |
| ELECTRONIC FILE DIVISION | 50 |

SOFTWARE FOR EFFECTIVE UTILIZATION OF DOCUMENTS WHICH PERFORMS UNIFORM MANAGEMENT OF ELECTRONIC DOCUMENTS AND PAPER DOCUMENTS. APPLICATION ...

| DATE AND TIME | ELECTRONIC FILE PATH | KINDS OF OPERATIONS | IMPORTANCE | TEXT INFORMATION | HASH VALUE | OPERATION TEXT | THUMBNAIL PATH |
|---|---|---|---|---|---|---|---|
| 2009/2/1 10:00:00 | \\server\A.xdw | OPEN ELECTRONIC FILE | 5 | | A3F023BC | | |
| 2009/2/1 10:05:00 | \\server\A.xdw | ENLARGED DISPLAY | 290 | | | | c:\thumbnail\A2_090201.bmp |
| 2009/2/1 10:10:00 | \\server\A.xdw | TEXT COPY | 250 | | | | c:\thumbnail\A3_090201.bmp |
| 2009/2/1 10:15:00 | \\server\A.xdw | TEXT DATA ATTACH | 205 | | | HERE IMPORTANT! | c:\thumbnail\A4_090201.bmp |
| 2009/2/1 10:20:00 | \\server\A.xdw | GRAPHIC DATA ATTACH | 50 | | | | c:\thumbnail\A5_090201.bmp |
| 2009/2/1 10:25:00 | \\server\A.xdw | IMAGE COPY | 50 | | | | c:\thumbnail\A1_090201.bmp |
| 2009/2/1 14:00:00 | \\server\B.xdw | OPEN ELECTRONIC FILE | 5 | | B53E9724 | | c:\thumbnail\B1_090201.bmp |
| 2009/2/1 14:10:00 | \\server\B.xdw | PAGE MOVEMENT | 50 | | | | c:\thumbnail\B2_090201.bmp |
| 2009/2/2 11:00:00 | \\server\A.xdw | OPEN ELECTRONIC FILE | 5 | | A3F023BC | | c:\thumbnail\A1_090202.bmp |
| ... | ... | ... | ... | ... | ... | ... | ... |

VARIOUS ... WHICH SUPPORT NOT ONLY OCR OR SEARCH FUNCTION BUT ALSO OPTIMIZATION OF BUSINESS

UNIFORM MANAGEMENT OF IMAGE FILES, SUCH AS TIFF OR JPEG, STARTING FROM OFFICE SOFTWARE

INFORMATION PROCESSING APPARATUS, INFORMATION PROCESSING METHOD AND COMPUTER READABLE MEDIUM

CROSS-REFERENCE TO RELATED APPLICATIONS

This application is based upon and claims priority under 35 USC 119 from Japanese Patent Application No. 2009-166693, filed Jul. 15, 2009.

BACKGROUND

Technical Field

The present invention relates to an information processing apparatus, an information processing method, and a computer readable medium.

SUMMARY OF THE INVENTION

According to an aspect of the invention, an information processing apparatus includes an operation acquisition module, a thumbnail image creating module, and a thumbnail image storing control module. The operation acquisition module acquires an operation to an electronic file displayed on a display device, the operation to be acquired by the operation acquisition module being set previously. The thumbnail image creating module creates a thumbnail image corresponding to the acquired operation. The thumbnail image storing control module controls the thumbnail image so as to store the thumbnail image associated with specifying information by which the electronic file is specified.

BRIEF DESCRIPTION OF THE DRAWINGS

Exemplary embodiments of the invention will be described in detail based on the following figures, wherein.

DETAILED DESCRIPTION

Figure 1:
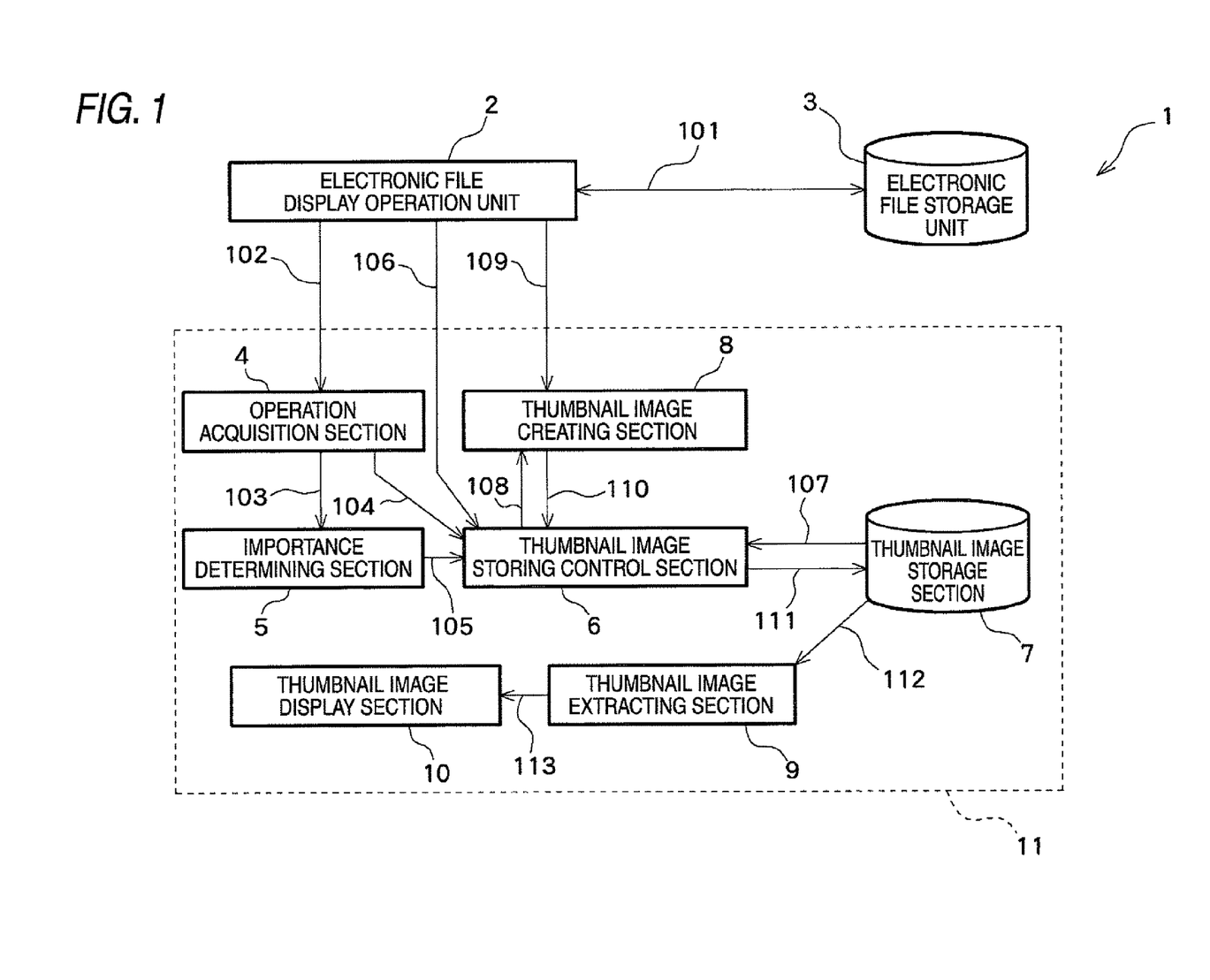
FIG. 1 is a functional block diagram of an information processing apparatus according to a first embodiment.

FIG. 1 is a functional block diagram of an information processing apparatus 1 according to a first embodiment of the invention.

The information processing apparatus is physically realized by using a normal computer which is a general-purpose information processing apparatus and which includes a CPU (Central Processing Unit), a memory, an input/output interface, a monitor, an external storage device, and the like. In addition, the information processing apparatus 1 is virtually realized by executing a program for operating a computer as the information processing apparatus 1 in the computer. For example, the program for operating a computer as the information processing apparatus 1 may be supplied in a state of being recorded in an arbitrary information recording medium, such as a DVD-ROM (DVD-Read Only Memory) or a CD-ROM (Compact Disk Read Only Memory), or may be supplied as a computer-readable electric signal through an electric communication line, such as a public line represented by the Internet.

The information processing apparatus 1 has an electronic file display operation unit 2 and an electronic file storage unit 3. Using the electronic file display operation unit 2, a user reads an electronic file from the electronic file storage unit 3, displays the electronic file on a screen, and performs operations such as browse and/or edit.

Specifically, the electronic file display operation unit 2 is realized by various types of document or image viewers, which are executed in a computer, or by software, such as document input software, DTP (DeskTop Publishing) software, and a WEB browser. In addition, the electronic file storage unit 3 is an information recording medium which stores various types of electronic files. For example, the electronic file storage unit 3 may be an HDD (Hard Disk), a nonvolatile memory, or a magnetic tape or may be a WEB server or a storage server which is connected through a WAN (Wide Area Network) or a LAN (Local Area Network) such as the Internet.

Using the electronic file display operation unit 2, a user reads an electronic file stored in the electronic file storage unit 3 as indicated by an arrow 101 and displays it on a screen of a monitor, or newly creates an electronic file by the electronic file display operation unit 2 and stores it in the electronic file storage unit 3.

An operation acquisition section 4 detects an operation on an electronic file by using the electronic file display operation unit 2 by a user and acquires which type of operation has been performed as indicated by an arrow 102. The operation to be detected is set previously. The acquired contents of operation are notified to an importance determining section 5 and a thumbnail image storing control section 6 as shown by arrows 103 and 104, respectively.

Figure 2:
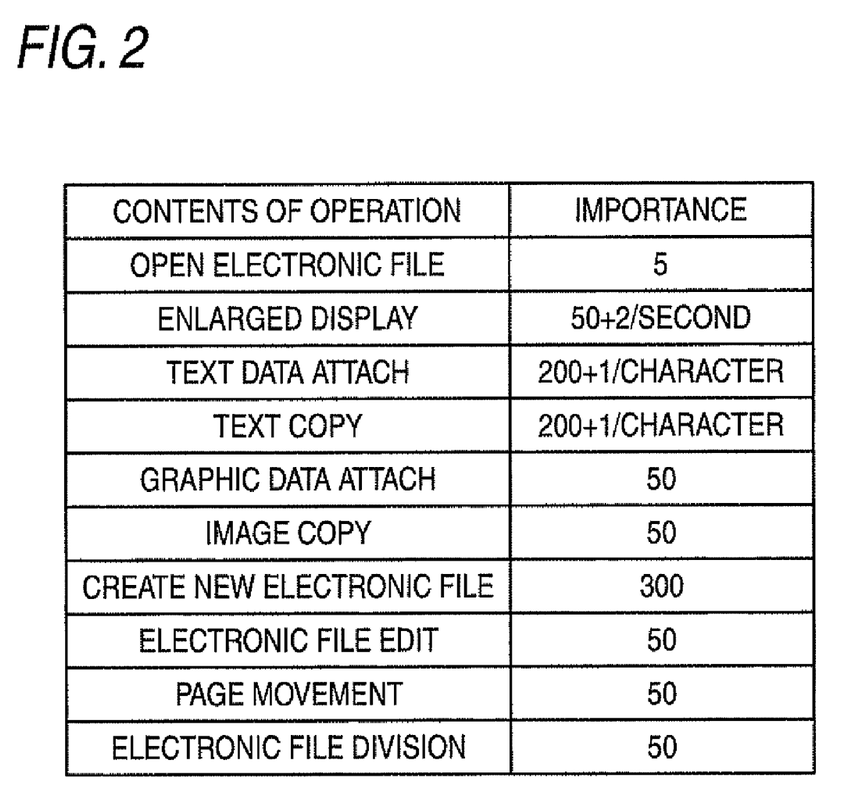
FIG. 2 is a table showing an example of the importance given according to the acquired contents of an operation.

The importance determining section 5 determines an importance of the acquired contents of the operation according to the acquired contents of the operation, and notifies the importance to the thumbnail image storing control section 6 as indicated by an arrow 105. The importance may be expressed as any type of information as long as it is the information indicating the priority level. In the present embodiment, the importance is expressed numerically, and the importance increases as the numeric value increases. FIG. 2 is a table showing an example of the importance with respect to the acquired contents of operation.

In FIG. 2, the left column shows the contents of operation acquired by the operation acquisition section 4, and the right column shows the importance correlated with each operation. For example, the contents of operation of "open an electronic file" indicates that a user reads an electronic file stored in the electronic file storage unit 3 using the electronic file display operation unit 2 and displays the electronic file on a screen, and "5" is given as the importance of this operation. For example, "enlarged display" is an operation of displaying a part of a displayed electronic file in an enlarged manner and the sum of "50" and "2" per second according to the time of the enlarged display, is given as the importance of this operation. "Text data attach" is an operation of adding a text memo, comment, or the like on the display screen and the sum of "200" and "1" per character of the added text, is given as the importance of this operation. "Text copy" indicates an operation of copying a text in a displayed electronic file, "graphic data attach" indicates an operation of adding an underline or a rectangular or circular surrounding line on a display screen or an operation of adding a mark using a figure, such as a check mark, on the display screen, and "image copy" indicates an operation of copying a part of a display screen as an image. "Create a new electronic file" indicates an operation of newly creating an electronic file using the electronic file display operation unit 2, and "electronic file edit" indicates an operation of editing the contents of an electronic file. "Page movement" indicates an operation of moving or changing the position of a page or sheet when an electronic file is a document managed in the unit of a page or sheet. In addition, "electronic file division" indicates an operation of extracting some pages or sheets as another electronic file when an electronic file is a document managed in the unit of a page or sheet or indicates an operation of separately extracting each electronic file from a bundled electronic file when an electronic file is a bundled electronic file including a plurality of electronic files created by a plurality of types of applications, for example.

The above operations are examples, and the importance may not be given to all of the operations or importance may be given to an operation which is not adopted herein. In addition, the importance given to each operation is also an example and may be appropriately changed.

When the thumbnail image storing control section 6 receives the notification of the contents of operation from the operation acquisition section 4 and receives the notification of the importance from the importance determining section 5, the thumbnail image storing control section 6 performs an operation for acquiring and storing a thumbnail image. Here, the thumbnail image refers to an image showing a display image when the contents of an electronic file are visually displayed. The display image of an electronic file used as a thumbnail image is not limited to a first image when the electronic file is displayed, and may be a part of the first image or may be an image showing a state when various types of operation have been performed. In addition, a thumbnail image is obtained by reducing a display image of an electronic file in an appropriate size in many cases. However, the display image may have the same size or may be enlarged.

Figure 3:
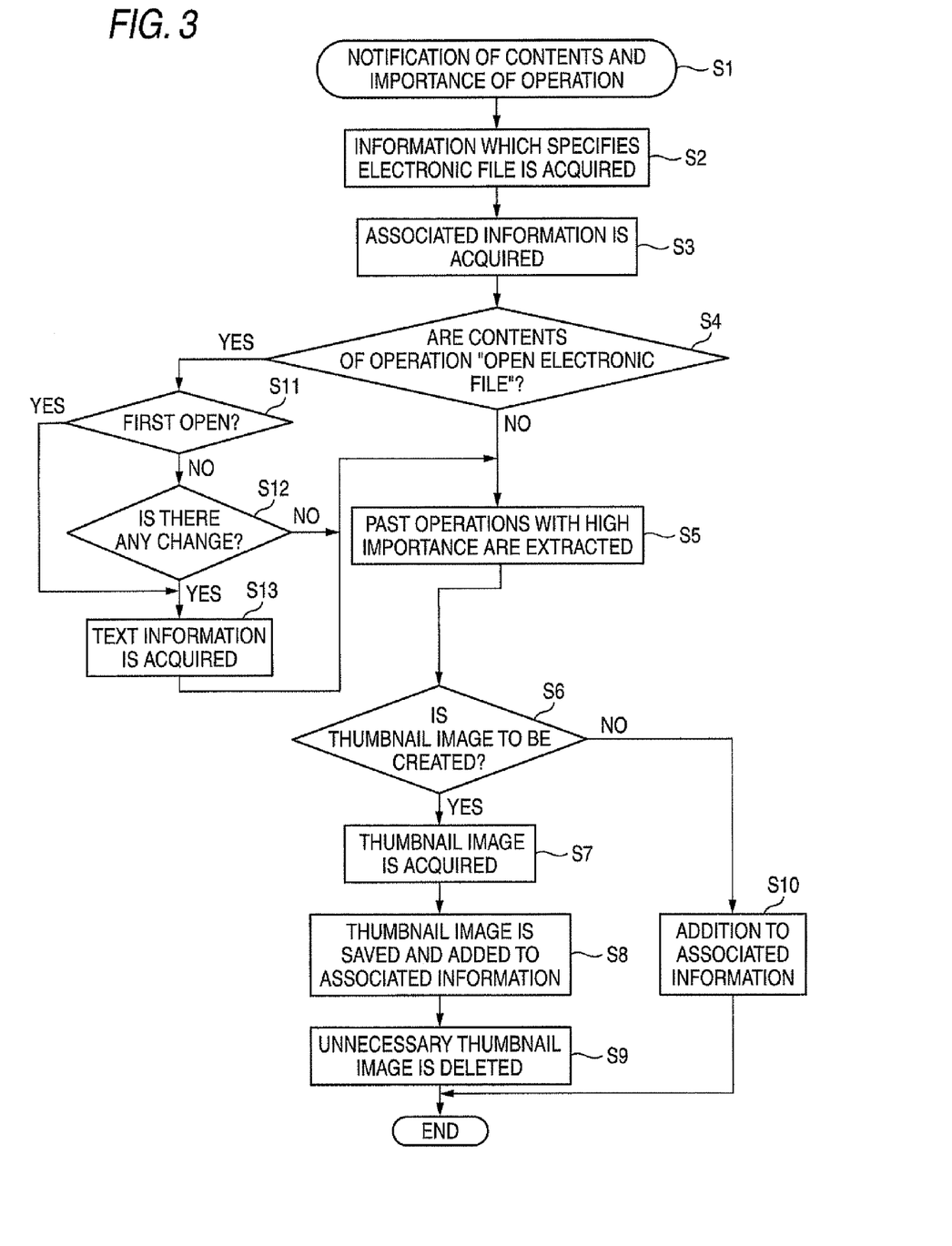
FIG. 3 is a flow chart showing the algorithm of an operation of a thumbnail image storing control section.

FIG. 3 is a flow chart showing the algorithm of an operation of the thumbnail image storing control section 6. Hereinafter, the operation of the thumbnail image storing control section 6 will be described with reference to FIG. 3. In this explanation, FIG. 1 is also appropriately referred to.

First, the thumbnail image storing control section 6 receives the notification of the contents of operation and the importance (step S1), and acquires the information, which specifies an electronic file related to the operation, from the electronic file display operation unit 2 as indicated by an arrow 106 in FIG. 1 (step S2). Here, the information which specifies an electronic file is information for specifying the storage location of the electronic file in the electronic file storage unit 3, and may be a path name of an electronic file in a file system. Or the information which specifies an electronic file may be a URL (Uniform Resource Locator) when the electronic file storage unit 3 is connected through a WAN, such as the Internet.

Then, the thumbnail image storing control section 6 reads the associated information from the thumbnail image storage section 7 as indicated by an arrow 107 (step S3). Here, the thumbnail image storage section 7 is an information storage means for storing a thumbnail image and the associated information which is information for associating the thumbnail image with the information for specifying an electronic file or the importance and other information items. Similar to the electronic file storage unit 3, various types of information storage means including an HOD may be used as the thumbnail image storage section 7. In addition, the electronic file storage unit 3 and the thumbnail image storage section 7 are separately shown in FIG. 1. However, this is a display for convenience based on the functional distinction, and both the electronic file storage unit 3 and the thumbnail image storage section 7 may use physically the same information storage means. For example, it is possible to set partitions in the same HOD or create different folders on a file system and to assign the partitions or folders as the electronic file storage unit 3 and the thumbnail image storage section 7.

Subsequently, in step S4, it is determined whether or not the acquired contents of operation is "open an electronic file". This determination is performed to determine whether or not the text information on an electronic file related to the operation is to be acquired, which will be described later. If the contents of the operation is not "open an electronic file", the process proceeds to step S5.

Then, in step S5, the thumbnail image storing control section 6 extracts given number (set previously) of past operations with high importance on an electronic file, which is an object to be operated, from the associated information within a given period. In the present embodiment, it is assumed that "within the given period" means the same date. That is, an operation performed on the same day as the day when the operation acquired by the operation acquisition section 4 was performed is an object to be extracted. In addition, the number set previously is assumed to be 5 herein. The period set previously may be arbitrarily set. For example, a week or month may be set instead of a day, a period until an electronic file to be operated is closed after the electronic file is opened may be set, or the whole period for which a user uses the information processing apparatus 1 may be set. The number also may be set an arbitrary number. For example, it may be 1.

Then, the thumbnail image storing control section 6 determines whether to create a thumbnail image (step S6). Here, the importance notified by the importance determining section 5 is compared with the lowest one of past importance extracted. If the importance notified by the importance determining section 5 is higher than the lowest past importance, the thumbnail image storing control section 6 determines that a thumbnail image is created. If the importance notified by the importance determining section 5 is lower than the lowest past importance, the thumbnail image storing control section 6 determines that a thumbnail image is not created. In addition, if the number of extracted operations is less than the number set previously, the thumbnail image storing control section 6 determines that a thumbnail image is created.

The thumbnail image storing control section 6 acquires a thumbnail image when it is determined that a thumbnail image is created (step S7). Accordingly, the thumbnail image storing control section 6 instructs a thumbnail image creating section to create a thumbnail image as indicated by an arrow 108 shown in FIG. 1. In response to the instruction, the thumbnail image creating section 8 acquires a display screen of the electronic file displayed on the screen by the electronic file display operation unit 2 (arrow 109 in FIG. 1) and creates a thumbnail image on the basis of the display screen. In this case, it is preferable to create a thumbnail image by cutting a part of the display screen appropriately according to the type of operation acquired by the operation acquisition section 4. Here, the type of acquired operation is included in the instruction to create a thumbnail image from the thumbnail image storing control section 6. However, the thumbnail image creating section 8 may acquire the type of acquired operation directly from the operation acquisition section 4. The size or resolution of a thumbnail image is arbitrary, and the display screen of the acquired electronic file may be used as a thumbnail image as it is. However, it is desirable to select the size and resolution which allow a plurality of thumbnail images to be easily viewed when the plurality of thumbnail images is list-displayed, which will be described later. The created thumbnail image is transmitted to the thumbnail image storing control section 6 as indicated by an arrow 110 in FIG. 1.

As indicated by the arrow 111, the thumbnail image storing control section 6 stores the transmitted thumbnail image in the thumbnail image storage section 7 and also adds the information associated with the thumbnail image to the associated information, and stores them in the thumbnail image storage section 7. For example, the information associated with the thumbnail image may be the type of operation, information which is an object of the operation, date and time at which the operation was performed, text information and importance of the electronic file, and the like. In addition, the information mentioned herein as the information associated with a thumbnail image is an example, and all of the information items may not be stored or other information items may be further stored. Moreover, the combination of information stored may change according to the type of operation.

Then, the thumbnail image storing control section 6 deletes an unnecessary thumbnail image from the thumbnail image storage section 7 (step S9 in FIG. 3). The unnecessary thumbnail image is a thumbnail image associated with an operation with lowest importance among the extracted operations. In addition, when the number of extracted operations is less than the number set previously, deletion of a thumbnail image is not performed since unnecessary thumbnail images are not present.

On the other hand, if it is determined that a thumbnail image is not created in step S6 of FIG. 3, the process proceeds to step S10 in which the type of operation and other information items are added to the associated information and a thumbnail image is not created. Here, the reason why the type of operation and other information items are added to the associated information is to record the history of user's operations. If the information regarding an operation which is not related to a thumbnail image is not necessary, step S9 is not required.

After step S9 or step S10, the thumbnail image storing control section 6 ends the operation.

In addition, if the contents of the operation acquired in step S4 are "open an electronic file", the process proceeds to step S11 in which it is determined whether or not an electronic file related to the operation has been opened for the first time. This determination may be performed by any method. For example, the determination is preferably performed by determining whether or not a history of having operated the same electronic file in the past exists in the associated information. If this determination is positive, the process proceeds to step S13 in which the text information included in the electronic file is acquired and is added to the associated information in step S8 or S10 described above.

If the determination in step S11 is negative, it is determined whether or not the electronic file has been changed in step S12. This determination may be performed in any method. For example, it is preferable to perform the determination in a method in which a hash value is generated using a hash function on the basis of the information on the electronic file when an electronic file is first opened and the hash value is recorded in the associated information, and then a hash value is generated similarly when the same electronic file is opened and both the hash values are compared with each other to check whether or not the hash values are equal. Alternatively, it is also possible to compare the text information, which is recorded in the associated information when the electronic file is first opened, with the text information acquired when the same electronic file is opened next. Moreover, if the time information indicating last update date and time is given to the electronic file itself, the time information may be compared. If this determination is positive, the process proceeds to step S13 in which the text information is acquired. If this determination is negative, the process proceeds to step S5 because it is not necessary to record the repeated information.

If the text information included in an electronic file is not recorded, steps S4 and S11 to 13 may be omitted. Moreover, since step S12 is executed to record the text information before and after updating when an electronic file is updated, step S12 is not necessary if the text information after updating is not recorded. In addition, when it is preferable to record only the text information after updating, a configuration may be adopted in which the text information before updating is deleted from the associated information.

According to the above operation, the thumbnail image storing control section 6 preferentially saves the thumbnail image, which corresponds to the operation of which importance is determined to be high, such that the number of thumbnail images saved for one electronic file is equal to or smaller than a number set previously within a period set previously. Here, the flow chart shown in FIG. 3 and the above description show an example of the operation of the thumbnail image storing control section 6, and it is also possible to use any other algorithm which realizes the same function.

Moreover, in the present embodiment, a thumbnail image created by the thumbnail image creating section 8 is based on a display screen of an electronic file, which is shown on a screen by the electronic file display operation unit 2 at the time of a user's operation. The reason is that when a user performs a certain operation actively on an electronic file, the user memorizes the screen image displaying the operated file.

Referring back to FIG. 1, thumbnail images stored in the thumbnail image storage section 7 are list-displayed by a thumbnail image extracting section 9 and a thumbnail image display section 10. The thumbnail image extracting section 9 extracts thumbnail images which match the conditions designated by the user, for example, the type of operation, information which is an object of the operation, date and time at which the operation was performed, text information on the electronic file, and/or conditions for narrowing the importance referring to the associated information stored in the thumbnail image storage section 7 as indicated by an arrow 112, and transmits the extracted thumbnail images to the thumbnail image display section 10. The thumbnail image display section 10 displays the transmitted thumbnail images on a monitor so as to be list-displayed. The user searches an electronic file that the user wants while viewing the displayed thumbnail images.

As described above, in the present embodiment, thumbnail images of electronic files operated by the user are created and list-displayed. Such a function is realized by a thumbnail image storing and display unit 11 which is a portion surrounded by a dotted line in FIG. 1. There are various types of methods of realizing the thumbnail image storing and display unit 11 in the information processing apparatus 1. In the present embodiment, as an example, the thumbnail image storing and display unit 11 is added to various types of document or image viewers and software, such as document input software, DTP software, and a WEB browser, which realize the electronic file display operation unit 2. That is, the software includes both a program for operating the information processing apparatus 1 as the electronic file display operation unit 2 and a program for operating the information processing apparatus 1 as the thumbnail image storing and display unit 11.

Next, in order to make the information processing apparatus 1 according to the present embodiment easily understood, the operation of the information processing apparatus 1 will be described using a specific example. In addition, the following explanation is only an example of the operation of the information processing apparatus 1, and the operation of the information processing apparatus 1 is not limited to the operation in the following explanation.

Figure 4:
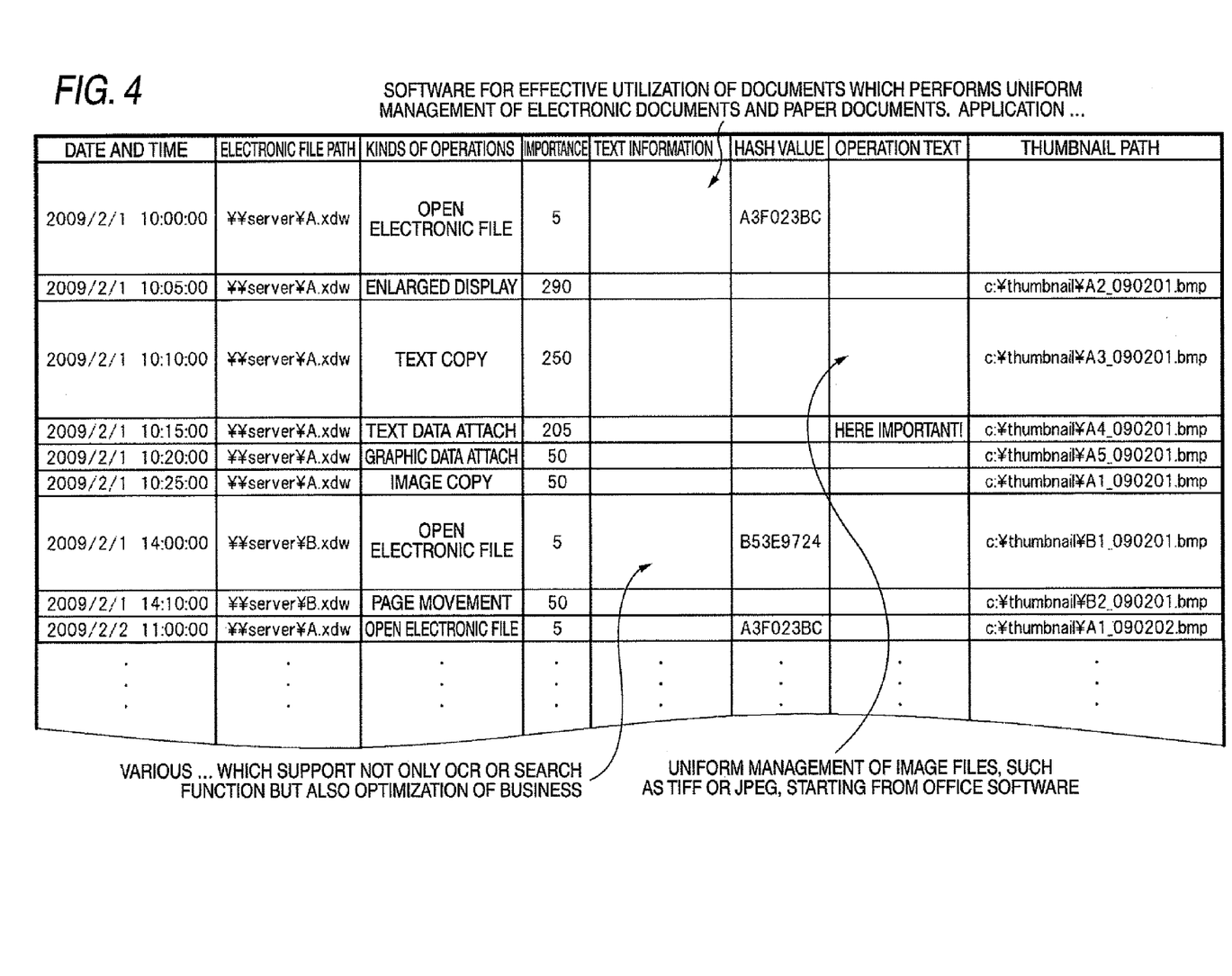
FIG. 4 is an example of the associated information created by the information processing apparatus 1 according to the first embodiment.

FIG. 4 is an example of the associated information created by the information processing apparatus 1 according to the present embodiment. FIG. 4 shows the associated information in a table for easy understanding. In the table, a first row is an item showing the contents that each column indicates. Second and subsequent rows show the information acquired by carrying out an operation set previously.

The second row in the table shows that an electronic file "A.xdw", of which a path indicating the position of a file is "¥¥server¥A.xdw", was opened on Feb. 1, 2009 and the importance of "5" is given to the operation. In addition, the text information included in the electronic file is acquired, and the hash value calculated from the electronic file is recorded. Here, the hash value is given in 8-digit hexadecimal. However, the number of digits or notation of the hash value may be arbitrarily set.

Similarly, third to seventh rows in the table show that enlarged display, text copy, text data attach, graphic data attach, and image copy were further performed on the electronic file "A.xdw", and a path of a thumbnail image corresponding to a display screen at the time of each operation is shown. For example, the third row shows that a thumbnail image corresponding to a display screen at the time of enlarged display is stored in a path "C: ¥thumbnail¥A2_090201.bmp". Accordingly, the information included in the third row is saved so as to be associated with the thumbnail image "A2_090201.bmp". In addition, "operation text" in a fourth row indicates the information which is an object of the operation, and is the contents of copied text. Similarly, those recorded in the "operation text" in a fifth row are also the information which is an object of the operation, and is the text information written in a note or the like which is virtually attached on the display screen of an electronic file as a memo. In the table, an empty column indicates that there is no information to be specially recorded.

Here, the reason why a thumbnail image at the time of the operation of "open an electronic file" in the second row is not recorded is because a thumbnail image created when an electronic file is opened is overwritten with a thumbnail image "A1_090201.bmp" at the time of "image copy" in a seventh row. That is, at the time of "image copy", five thumbnail images regarding the electronic file "A.xdw" already exist. Accordingly, the thumbnail image created at the time of the operation of "open an electronic file" with the lowest importance is deleted, and the thumbnail image at the time of "image copy" is newly stored.

In addition, when deleting a thumbnail image, a row of the corresponding associated information may also be deleted. In the present embodiment, however, only a thumbnail image and its path are deleted and the other information items are left.

In an eighth row, it is recorded that another electronic file "B.xdw" was newly opened and the importance, text information and a hash value, and a path of an associated thumbnail image are recorded simultaneously.

In a ninth row, the importance regarding "page movement", which is an operation on the electronic file "B.xdw", and a path of an associated thumbnail image are recorded.

A tenth row shows that the electronic file "A.xdw" was opened again. This operation was performed on Feb. 2, 2009. Accordingly, since the operation date is different from the operations recorded in the second to seventh rows, thumbnail images are newly recorded within the number set previously. In addition, it is preferable that the information processing apparatus 1 automatically creates a file name of a thumbnail image so as not to be equal to those of other files or thumbnail images. Here, an operation date and a file name of a file, which is an object of the operation, are used as a file name of a thumbnail image, so that a thumbnail image with the same file name is not created.

The electronic file "A.xdw" was already opened on Feb. 1, 2009. Therefore, the information processing apparatus 1 calculates a hash value from the electronic file and compares it with a hash value saved in the second row. In this case, there is no change in the hash value. Accordingly, it is determined that the electronic file is not changed and the text information is not newly recorded.

Figure 5:
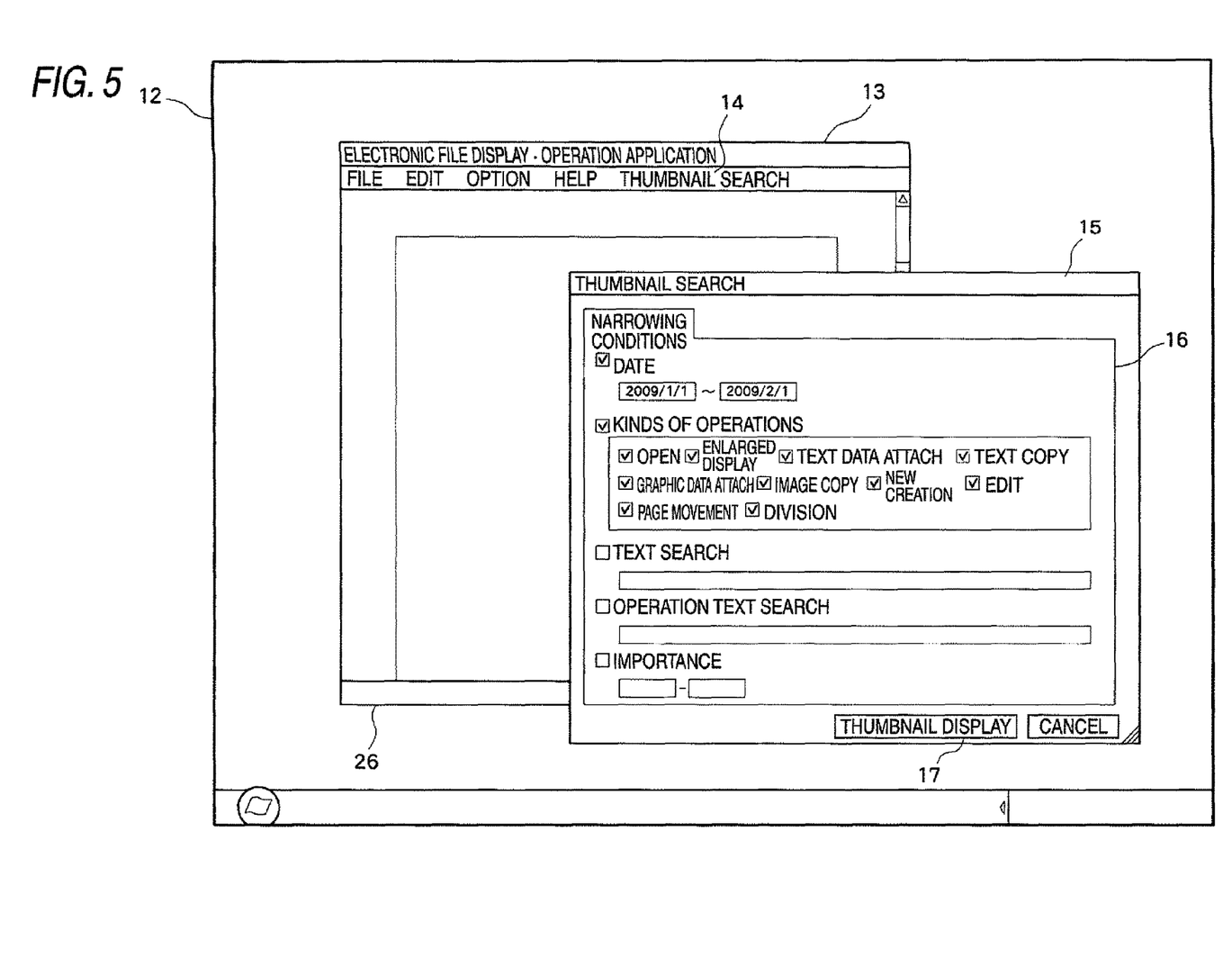
FIG. 5 is a view showing a GUI (Graphical User Interface) of the information processing apparatus of the first embodiment.

FIG. 5 is a view showing a GUI (Graphical User Interface) of the information processing apparatus 1 of the present embodiment. In addition, FIG. 5 illustrates an aspect of the user interface of the information processing apparatus 1, but the invention is not limited to this configuration. The information processing apparatus 1 does not necessarily need to have a GUI, and a method of receiving information from a user or a method of information presentation, such as a command input method, is arbitrary.

Reference numeral 12 denotes a monitor screen of the information processing apparatus 1. A program for causing a computer to operate as the information processing apparatus 1 operates on the OS (Operation System) which operates on the computer. In the present embodiment, the OS realizes so-called multi-task and multi-window display.

Reference numeral 13 denotes a window which is a GUI of the electronic file display operation unit 2. The user displays, browses, or edits an electronic file on the window 13. On the window 13, there is a menu for "thumbnail search" indicated by reference numeral 14. If the menu is selected, a window 15 which is a GUI of the thumbnail image extracting section 9 is displayed. FIG. 5 shows a state where the menu has been selected.

On the window 15, a narrowing condition setting region 16 for setting the conditions of extracting a thumbnail image is prepared. The user sets the conditions applicable to an electronic file to search in the narrowing condition setting region 16. In the example of the present embodiment, the user checks left check boxes of the conditions for narrowing and further inputs the conditions if necessary. In the example shown in FIG. 5, thumbnail images created for all types of operation from Jan. 1, 2009 to Feb. 1, 2009 which is the date for which the operations were performed are searched. In addition, the date search conditions may be set not only by using a method of directly designating a date as shown in FIG. 5 but also by using a method of designating a date with a search date as a reference. For example, a method of designation, such as "until some days ago" or "from one month ago to one week ago", may be used. Moreover, regarding the type of operation, if a left check box corresponding to the type of operation that the user wants to extract is checked, a thumbnail image related to the operation is extracted. Text search and operation text search are for searching the text information and operation text information including search texts input in input boxes, which are located below the text search and the operation text search, using the associated information and for extracting a thumbnail image related to the text information or the operation text information. In the present embodiment, the narrowing is also performed according to the importance. Undoubtedly, the types and setting methods of the narrowing conditions are examples, and other types and methods may be set.

Figure 6:
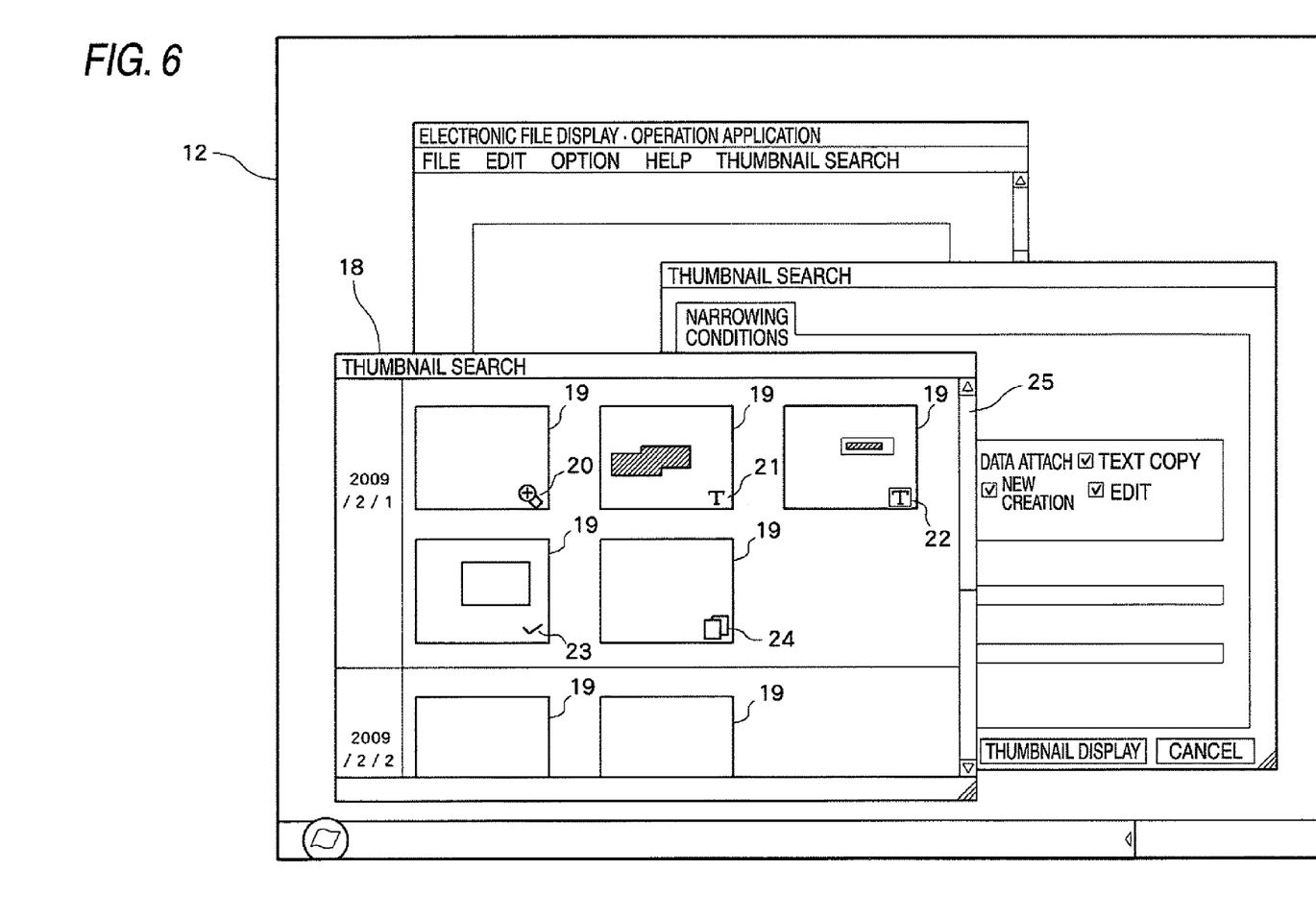
FIG. 6 is a view showing a GUI of the information processing apparatus of the first embodiment in which a list of thumbnail images is displayed.

If the condition setting is finished and a button 17 is pressed, a thumbnail image is extracted and the extracted thumbnail image is displayed by the thumbnail image display section 10. FIG. 6 is a view showing a GUI of the information processing apparatus 1 of the present embodiment in which a list of thumbnail images is displayed.

On the monitor screen 12, a window 18 which is a GUI of the thumbnail image display section 10 is newly displayed. In the window 18, extracted thumbnail images 19 are list-displayed for every date. In addition, icon images 20 to 24 are displayed at the corners of the thumbnail images 19, respectively. Here, an icon image is a mark for displaying certain information visually and is usually displayed as a graphic symbol with a relatively small size. The information meant by an icon image is not particularly limited and arbitrary information, such as an electronic file or application and various types of operation or network connection, may be associated with the icon image.

The user searches an electronic file that the user wants while viewing the thumbnail images 19 which are list-displayed. In addition, when the thumbnail image 19 is not included in the window 18, it is possible to scroll the thumbnail image 19 by operating a scroll bar 25 appropriately and to search a target image. In addition, although the thumbnail images 19 are displayed side by side for every date in the present embodiment, the thumbnail images 19 may be displayed in another format, for example, in the order of importance or in the order of types of operation. Alternatively, the thumbnail images 19 may be aligned for every electronic file to be operated. Such a display order may be appropriately changed by setting by a user.

The icon images 20 to 24 show the types of operation. For example, the icon image 20 shows an enlarged display, and the icon image 21 shows text copy. A specific operation may be performed when each of the icon images 20 to 24 is selected by click of a mouse button or the like. For example, when the icon image 21 showing text copy or the icon image 22 showing text data attach is clicked, a balloon which displays the operation text may be displayed. An operation when the icon image corresponding to the type of each operation has been selected may be appropriately set. It is a matter of course that the display of the icon images 20 to 24 is not essential, and the icon images 20 to 24 may be omitted. Alternatively, any means for showing the type of operation may be used instead of the icon images 20 to 24.

Moreover, when a user has found an electronic file that the user wants to search, it is preferable to open the found electronic file using the window 18. For example, if the specific thumbnail image 19 is double-clicked, an electronic file associated with the thumbnail image 19 is opened.

Here, the thumbnail image creating section 8 may create any type of thumbnail image according to various operations. It is possible to create any type of thumbnail image which is easy to remember when the user views the thumbnail image later. In the present embodiment, it is basically performed as follows as an example.

That is, if the types of operation are "open an electronic file" and "create a new electronic file", a display screen which is first displayed when opening the electronic file is set as a thumbnail image as it is or in a reduced scale. Moreover, in the case of "page movement", a display screen of a moved page is used. In the case of "electronic file division", a display screen which is first displayed when opening the divided electronic file is used. In the case of "enlarged display" and "image copy", a thumbnail image is created using a portion which is displayed in an enlarged manner and a copied portion, respectively. In the case of "text data attach", "text copy", "graphic data attach", and "electronic file edit", it may be difficult to understand if only an operated portion is set as a thumbnail image. Accordingly, the operated portion and a portion including the periphery may be cut to create a thumbnail image. Which range of the surrounding portion should be cut may change according to the contents of an electronic file which is displayed when performing the operation. However, the cut range may be preferably set according to the type of each operation in consideration of the conspicuousness of a thumbnail image.

Examples of a specific method of creating a thumbnail image according to various types of operation are shown below. Undoubtedly, these are examples and do not limit the method of creating a thumbnail image according to various types of operation. In addition, it is needless to say that the method mentioned herein or other methods applied according to the operation may also be used for operations which are not mentioned herein.

Figure 7A:
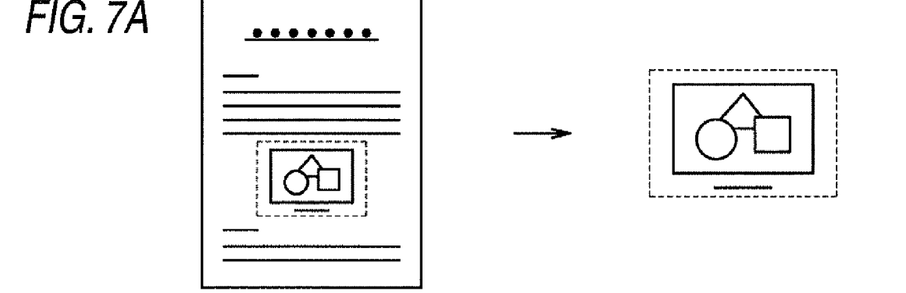
FIGS. 7A to 7D are views showing specific methods of creating a thumbnail image according to various types of operation.

FIGS. 7A to 7D are views showing specific methods of creating a thumbnail image according to various types of operation. FIG. 7A shows a thumbnail image creating method when a part of an electronic file is displayed in an enlarged manner or image copy is performed. In FIG. 7A, the left side is a display image of an electronic file currently displayed at the time of an operation, and the right side is a thumbnail image which is created. Here, as an example for explanation, data of a document including a figure is set as the display image of an electronic file. In addition, a rectangle shown by a dotted line in the display image of the electronic file indicates a region that the user designated as a range to be displayed in an enlarged manner or to be image-copied. In this case, as shown on the right side in FIG. 7A, a display image which matches the designated region is used as a thumbnail image. In addition, a display image which matches a region, which is larger than a display image matching the designated region by the rate set previously, for example, by 20% of the designated region, may be used as a thumbnail image. In the case of an operation of enlarged display, a display image after the enlarged display or a display image which matches a region, which is larger than the display image by the rate set previously, may be used as a thumbnail image.

Figure 7B:
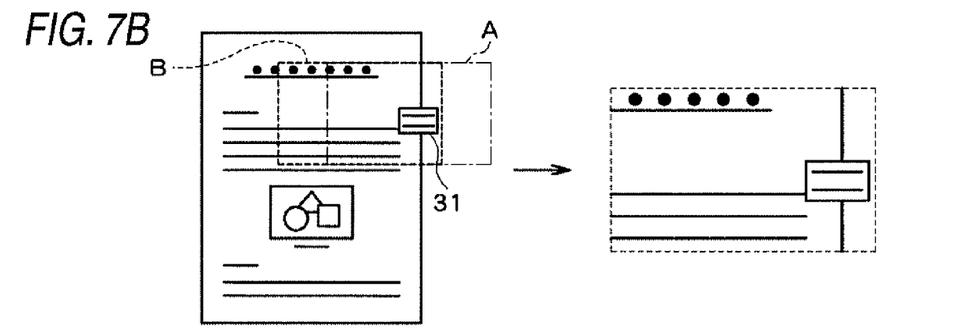

FIG. 7B shows a thumbnail image creating method in the case of text data attach. In FIG. 7B, a display image of an electronic file on the left side shows a state where a frame 31, which imitates a tag in which a memo is written, is added as the text data. In this case, a region A around the frame 31 set previously is selected as an object for which a thumbnail image is to be created. It is needless to say that a thumbnail image may be created using the region A as it is. In the present embodiment, however, when the region A protrudes to the outside of the region of the frame 31 or electronic file, the region which is an object for which a thumbnail image is to be created is moved to match or approximately match the outer edge of the frame 31 or electronic file. As a result, a region B is selected as a region which is an object for which a thumbnail image is to be created, and a display image which matches the region B is used as a thumbnail image as shown on the right side in FIG. 7B. In addition, the text data does not necessarily need to be displayed as a frame which imitates a tag, and the display format does not matter.

Figure 7C:
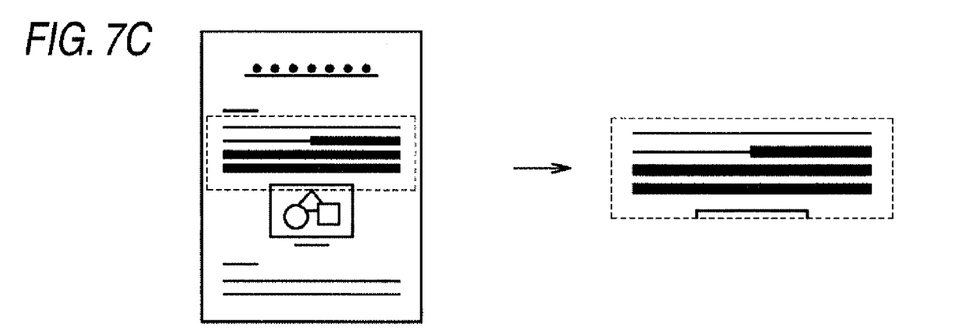

FIG. 7C shows a thumbnail image creating method in the case of text copy. In a display image of an electronic file shown on the left side in FIG. 7C, a black portion indicates a range which is selected by the user as a text to be copied and which is highlighted. In this case, a region which is larger than a minimum rectangular region including the selected range, that is, a rectangular region circumscribed to the selected range by the rate set previously, for example, by 30% of the rectangular region, may be used as an object region for which a thumbnail image is to be created. That is, a rectangular region obtained by increasing the length of each side of a rectangle circumscribed to the selected range by 30% is used. This rectangular region is shown by a dotted line in FIG. 7C, and the created thumbnail image is shown on the right side in FIG. 7C. When an object region for which a thumbnail image is to be created protrudes to the outside of an electronic file, the region may be moved appropriately or the protruding portion may be deleted.

Figure 7D:
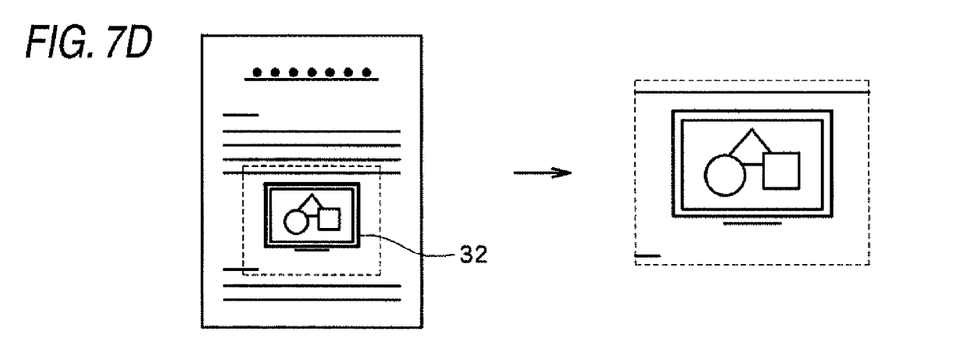

FIG. 7D shows a thumbnail image creating method in the case of graphic data attach. In a display image of an electronic file shown on the left side in FIG. 7D, a surrounding line 32 shown by a heavy line is added. Also in this case, similar to the case of text copy, a region which is larger than a minimum rectangular region including the selected range, that is, a rectangular region circumscribed to the selected range by the rate set previously is used as an object region for which a thumbnail image is to be created. In this case, the rate is 40% as an example. In addition, the rate may be changed according to the type of graphic data. The object region for which a thumbnail image is to be created is shown by a dotted line in FIG. 7D, and the created thumbnail image is shown on the right side in FIG. 7D. Moreover, similarly, when the object region for which a thumbnail image is to be created protrudes to the outside of the electronic file, the region may be moved appropriately or the protruding portion may be deleted.

Figure 8:
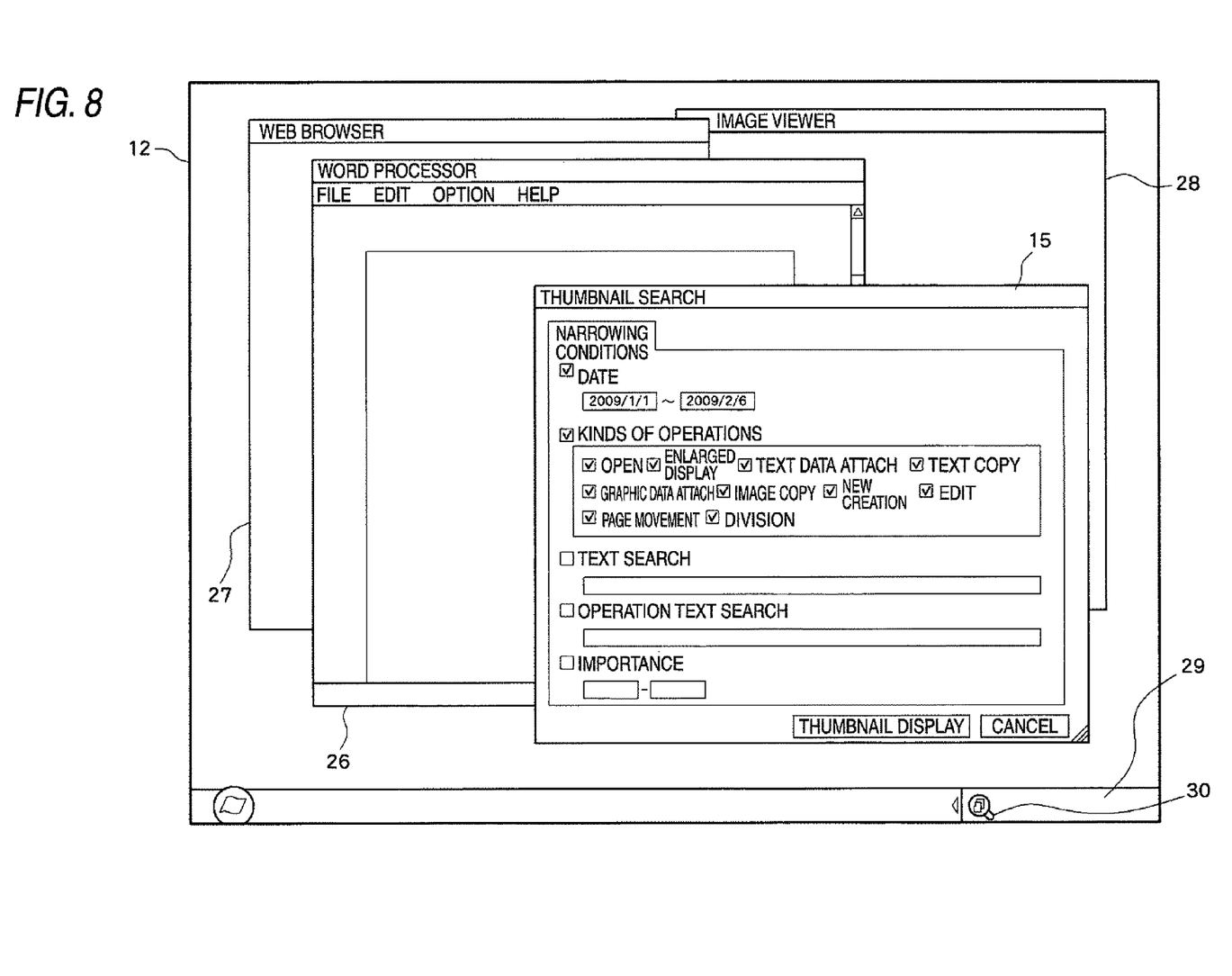
FIG. 8 is a view showing a GUI of an information processing apparatus according to a second embodiment of the invention.

FIG. 8 is a view showing a GUI of the information processing apparatus 1 according to a second embodiment of the invention. The configuration of a functional block of the information processing apparatus 1 in the present embodiment is the same as that in the first embodiment shown in FIG. 1, except that the thumbnail image storing and display unit 11 is not a part of software which realizes the electronic file display operation section 2 but is separately provided.

As shown in FIG. 8, in the present embodiment, an application equivalent to the electronic file display operation section is not necessarily one. Here, a window 26 of a word processor, a window 27 of a WEB browser, and a window 28 of an image viewer are displayed as examples. All of the word processor, the WEB browser, and the image viewer are examples of the electronic file display operation section of the present embodiment. In addition, the thumbnail image storing and display unit 11 is executed on the background of the above application. In this example, software executed on the background is shown as an icon image 30 in a region called a task tray 29.

When the user wants to search an electronic file on the basis of a thumbnail image, it is preferable to select the icon image 30. Then, a window 15 which is a GUI of the thumbnail image extracting section 9 is displayed. The next operations are the same as those in the first embodiment.

According to the present embodiment, even when browsing and editing an electronic file using a plurality of applications, a thumbnail image is created and saved on the basis of a display screen on which the operation was performed.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

What is claimed is;

1. An information processing apparatus comprising:
a display device;
a hardware processing unit that operates upon data and provides data for display on the display device;
an operation acquisition module that acquires an operation to an electronic file displayed on the display device, the operation to be acquired by the operation acquisition module being set previously;
a thumbnail image creating module that creates a thumbnail image corresponding to the acquired operation;
a thumbnail image storing control module that controls the thumbnail image so as to store the thumbnail image associated with specifying information by which the electronic file is specified; and
an importance determining module that determines an importance of the acquired operation,
wherein the thumbnail image storing control module controls the thumbnail image so as to store the thumbnail image associated with the specifying information and the determined importance, and
the thumbnail image storing control module controls the thumbnail image so as to preferentially store the thumbnail image which corresponds to the operation whose importance is determined to be high so that the stored number of thumbnail images for the electronic file is equal to or smaller than a given number within a given period.

2. The information processing apparatus according to claim 1, wherein the thumbnail image storing control module controls the thumbnail image so as to store the thumbnail image associated with the specifying information, a type of the acquired operation, and an icon image showing the operation.

3. The information processing apparatus according to claim 1, wherein the thumbnail image storing control module controls the thumbnail image so as to store the thumbnail image associated with the specifying information and an object of the operation.

4. The information processing apparatus according to claim 1, wherein the thumbnail image storing control module controls the thumbnail image so as to store the thumbnail image associated with at least one of a type of the operation, an object of the operation, date and time at which the operation is performed, and text information of the electronic file, the information processing apparatus further comprising:
a thumbnail image extracting module that extracts the thumbnail image matching a given condition which includes at least one of the type of operation, the object of the operation, the date and time, and the text information; and a thumbnail image display module that displays, on the display device, a list of the thumbnail images extracted by the thumbnail image extracting module.

5. The information processing apparatus according to claim 4, wherein when an electronic file that has text information is first displayed, the thumbnail image storing control module controls the thumbnail image so as to store the text information of the electronic file which is first displayed.

6. The information processing apparatus according to claim 5, wherein when the electronic file that has text information and that has been displayed is displayed again and the text information of the electronic file displayed again is changed, the thumbnail image storing control module controls the thumbnail image so as to store the text information of the electronic file again.

7. The information processing apparatus according to claim 1 further comprising a thumbnail image storage module, wherein the thumbnail image storing control module controls the thumbnail image so as to store the thumbnail image in the thumbnail image storage module, and the thumbnail image extracting module extracts the thumbnail image from the thumbnail storage module.

8. A non-transitory computer readable storage medium that stores a program causing a hardware processor to perform a process for controlling an information processing apparatus, the process comprising:

acquiring an operation to an electronic file displayed on a display device, the operation to be acquired being set previously;

creating a thumbnail image corresponding to the acquired operation;

controlling the thumbnail image so as to store the thumbnail image associated with specifying information by which the electronic file is specified: and determining an importance of the acquired operation, wherein controlling the thumbnail image further comprises storing the thumbnail image associated with the specifying information and the determined importance, and controlling the thumbnail image further comprises preferentially storing the thumbnail image which corresponds to the operation whose importance is determined to be high so that the stored number of thumbnail images for the electronic file is equal to or smaller than a given number within a given period.

9. A method for controlling availability of information, the method comprising:

acquiring an operation to an electronic file displayed on a display device, the operation to be acquired being set previously;

creating a thumbnail image corresponding to the acquired operation;

controlling the thumbnail image so as to store the thumbnail image associated with specifying information by which the electronic file is specified; and determining an importance of the acquired operation, wherein controlling the thumbnail image further comprises storing the thumbnail image associated with the specifying information and the determined importance, and controlling the thumbnail image further comprises preferentially storing the thumbnail image which corresponds to the operation whose importance is determined to be high so that the stored number of thumbnail images for the electronic file is equal to or smaller than a given number within a given period.

* * * * *